Sept. 24, 1935. J. H. MILLER 2,015,316
RADIO SET TESTER
Filed Oct. 23, 1933 2 Sheets-Sheet 1
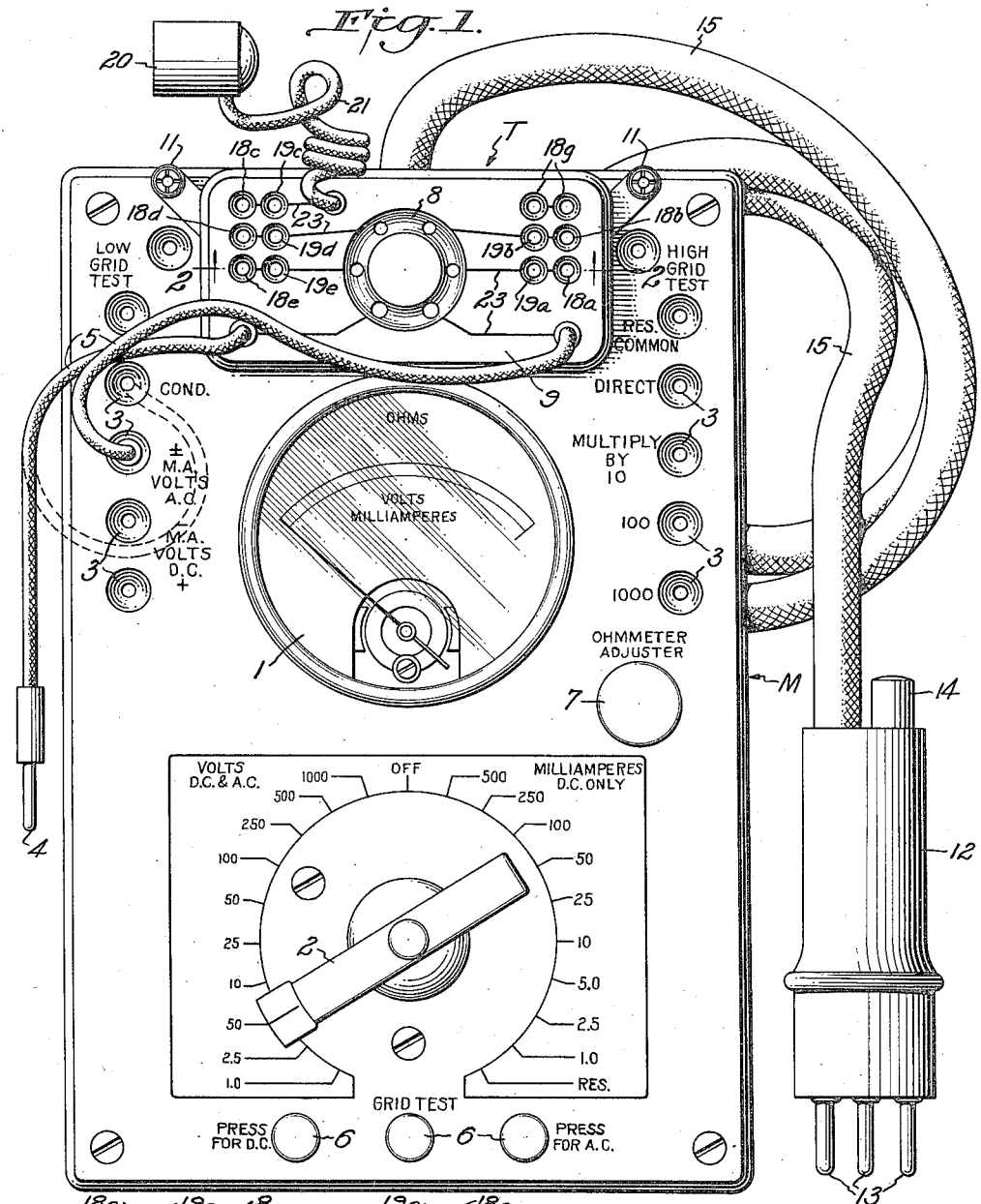
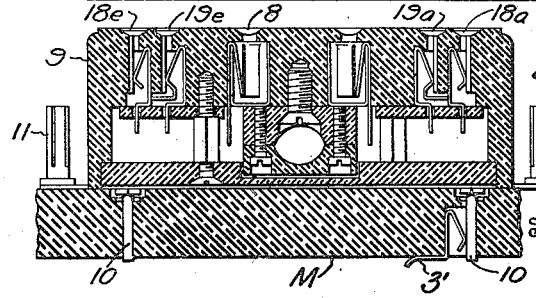

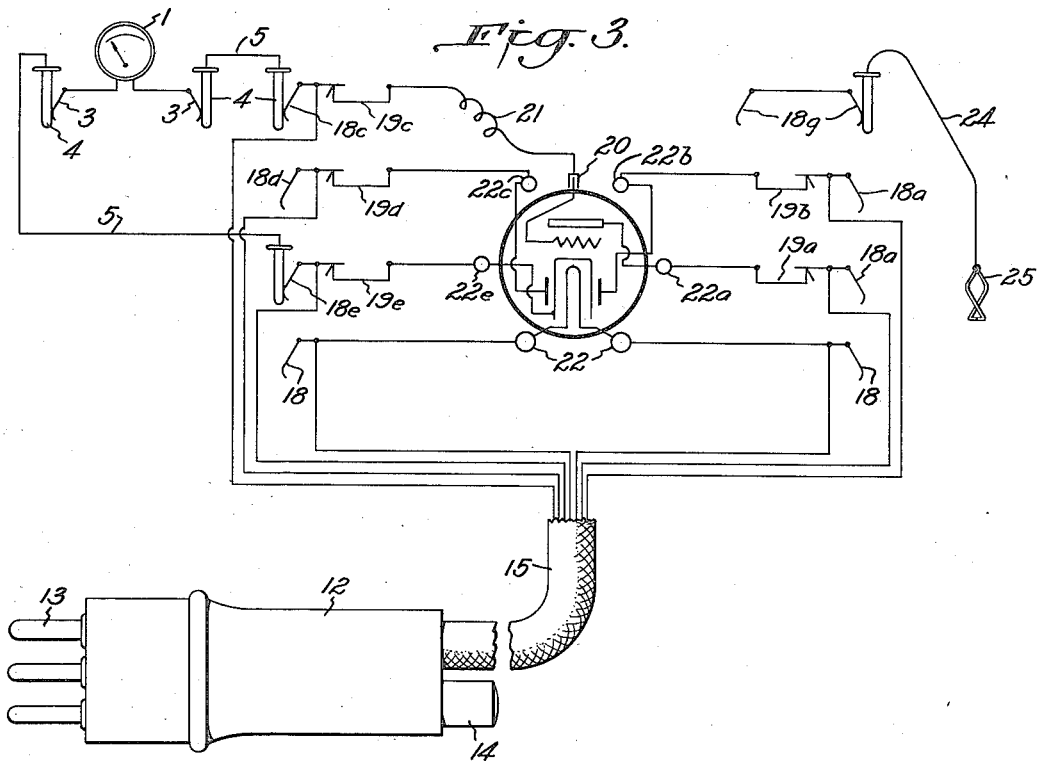
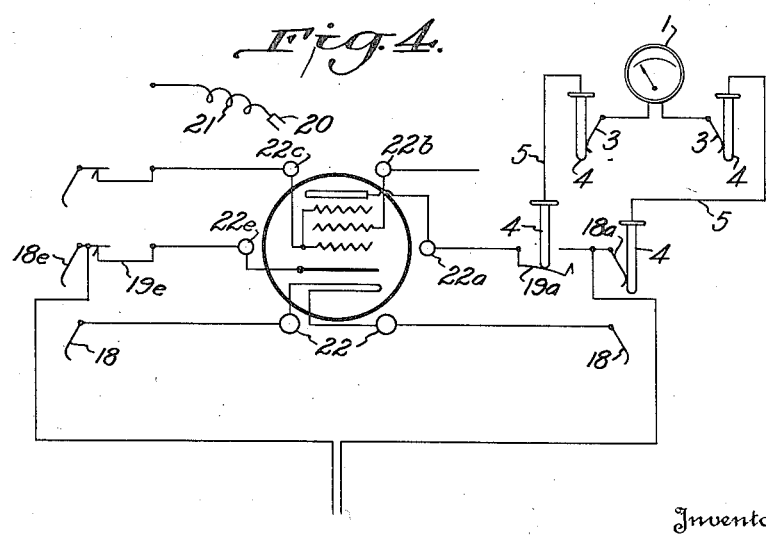

Patented Sept. 24, 1935

2,015,316

UNITED STATES PATENT OFFICE 2,015,316

RADIO SET TESTER

John H. Miller, East Orange, N. J., assignor to Weston Electrical Instrument Corporation, Newark, N. J., a corporation of New Jersey Application October 23, 1933, Serial No. 694,855

10 Claims. (Cl. 250—20)

This invention relates to radio set testers and particularly to testers of the type having a plug for insertion in a tube socket of the receiver and a socket for receiving the tube which was removed from the receiver socket.

Testers of this general type are well known and comprise, in general, a measuring instrument of the volt-milliammeter type and a network including resistors and switches for connecting the measuring instrument to appropriate terminals of the socket of the tester to permit the reading of the significant voltages, current flow and/or resistances at different portions of the receiver circuits associated with the receiver tube which was transferred to the socket of the tester. Such testers have been highly satisfactory so far as concerns the investigation of a radio receiver but the recent development of various types of tubes has presented a serious problem in the construction of set testing equipment. The progressive change from tubes with four prongs or terminals to tubes with five, six and seven prongs has rendered the original set testers of this type obsolete and it is to be expected that the present designs which include a plurality of sockets for receiving different types of tubes will be rendered obsolete with the development and commercial introduction of new types of tubes for radio receiving sets.

An object of the present invention is to provide testing apparatus of the type stated which may be employed for investigating the operation or condition of receivers which use any of the known types of tubes and which is adapted, upon the addition of simple and relatively inexpensive attachments, to test radio receivers employing tubes of any design which may be introduced in the future. A further object is to provide testing apparatus which is physically constructed as a main unit and one or more auxiliary units; the main unit comprising a measuring instrument and a network including switches, resistances and other appropriate circuit elements of known type, and each auxiliary unit including a transfer socket for receiving a tube of one particular terminal design.

These and other objects and advantages of the invention will be apparent from the following specification when taken with the accompanying drawings in which:

Fig. 1 is a plan view of a main testing unit and a transfer socket for a six prong tube;

Fig. 2 is a section taken through the transfer socket on line 2—2 of Fig. 1, the wiring connections between the elements of the transfer unit being omitted; and Figs. 3 and 4 are simplified circuit diagrams illustrating typical testing circuits which may be established with the apparatus shown in Figs. 1 and 2.

In the drawings, the reference character T identifies a transfer unit that may be removably attached to a main unit M of the receiver testing equipment. The unit M may conform to the general design of the known set testers, such as the "Weston Model 660 Set Analyzer", except that the tube socket and connecting plug of the previous apparatus may be omitted. In general, the unit M comprises a volt-milliammeter 1 and a wiring network including a selector switch, not shown, that may be adjusted by a handle or pointer 2 to establish desired connections between the instrument and a plurality of pin jacks 3. The pin jacks 3 are connected to points in the wiring network and are adapted to receive pin terminals 4 of a pair of jumper cables 5 to establish connections between the network of the unit M and some circuit external to the unit.

The main unit also includes switches operable by push buttons 6 for establishing those different circuit connections to the instrument which are appropriate for measurements of the type indicated by legends adjacent the push buttons, and a rotatable knob 7 for making resistance measurements.

In accordance with this invention, the socket 8 for receiving the tube removed from the radio receiver is not a part of the main unit M but is incorporated in a small base member 9 of the transfer unit, the lower face of the member 9 carrying a pair of plugs 10, Fig. 2, which may be inserted in appropriate sockets in the main unit M. Pin sockets 11 are electrically connected to the respective plugs 10 for making circuit connections to any contact jacks which may be located in the sockets of the main unit which receive the plugs 10. As shown at the left of Fig. 2, the plug 10 enters a simple socket or drilled hole in the panel of the unit M, but the socket at the right of the view is a pin jack 3'. Circuit connections to the jack 3' may be made by plugging a pin terminal into the right hand socket 11 of the transfer unit.

Each transfer unit includes a plug 12 having the same number and relative arrangement of prongs 13 as the tube which is to be placed in the socket 8 of that particular unit. The outer or top end of each plug is also provided with a contact 14 for receiving the cap contact employed with tubes, such as types 24, 55, etc., which have tip contacts.

The several leads between the plug 12 and the base member 9 are formed into a cable 15 which may be provided with a metallic sheath to prevent undesired couplings between the cable leads and the circuit elements of the receiver. The leads of the cable 15 are not connected directly to the terminals of the socket 8 but to pin jacks for receiving pin terminals 4 of a pair of jumper cables 5. Each connection between the plug 12 and socket 8 includes a jack 18 into which a pin terminal 4 may be inserted without opening the circuit and, except as to the circuits to the heater element H, each connection includes an additional jack 19 which opens the circuit when a pin terminal 4 is inserted. As shown in Fig. 2, the jacks 18, 19 are bent strips of resilient metal which are mounted in openings in the upper wall of the member 9, the bent end of each jack 19 normally contacting with the adjacent jack 18 but being deflected away from the jack 18 when a pin terminal is inserted. For convenience in tracing the circuit connections in Figs. 3 and 4, the pin jacks of the heater circuit are identified by the reference numerals 18, while the corresponding pin jacks of the first set are identified as 18a, 18b, etc., and the jacks of the circuit-opening set 19 are identified as 19a, 19b, etc. The cap terminal 20 is connected to its jack 19c by a flexible lead 21, and the remaining jacks 19a, 19b, etc. are connected to their corresponding terminals of the socket 8. The heater terminals of the socket 8 are identified by numerals 22, and the other socket contacts are indicated by numerals 22a, 22b, etc., corresponding to the jacks 19a, 19b, etc., to which the socket contacts are connected. The connections between the pin jacks and the socket terminals are indicated by lines 23 on the upper surface of the base member 9.

The base member 9 is also provided with a pair of "ground" jacks 18g which are not connected to the receiver through the cable 15 but which may, when desired, be connected to the receiver chassis by a jumper 24 that has one pin terminal and a clamp terminal 25.

For purposes of illustration, the drawings show a transfer unit for receiving a six prong tube, but it is to be understood that the complete testing equipment will include a main unit and a plurality of auxiliary or transfer units of different socket design. As tubes of new terminal design are introduced, the testing equipment may be brought up to date by adding a transfer unit having a socket for receiving the new tubes.

The method of employing the testing apparatus is indicated by the simplified circuit diagrams of Figs. 3 and 4 which omit a showing of the selector switch which is adjusted by the pointer 2. As shown in Fig. 3, the selector switch 2 is assumed to be set in the position appropriate for the measurement of the bias voltage between the cathode and the control grid of a tube inserted in the socket 8. For this measurement, one set of tips 4 of the cables 5 is inserted in the pin jacks 18c and 18e associated, respectively, with the circuits to the contacts 22c and 22e of the socket 8. The tube in socket 8 is assumed to be of the type 55 and the cap 20 is connected to the tip cap or control grid terminal of the tube. Similar voltage measurements may be made between any two socket terminals by shifting one set of pins 4 to the jacks 18 of those socket terminals.

The current flow in any circuit, except the heater circuit, may be measured by inserting the pins 4 in the adjacent jacks 18, 19 of that circuit. As shown in Fig. 4, the pins are inserted in the jacks 18a, 19a to connect the instrument 1 in series in the plate circuit, it being understood that the other pins 4 are inserted in those pin jacks 3 of the main unit which are connected to the milliammeter winding of instrument 1 and that the selector switch is adjusted by pointer 2 for the appropriate instrument range.

While the transfer unit has been described in connection with a main unit M that was particularly designed to cooperate with a series of transfer units, it will be apparent that a transfer unit may be used with the previous set testers having one or more sockets for receiving tubes. For example, a set tester having sockets for receiving tubes of up to six prongs may be modernized to permit the testing of receivers having seven prong tubes by attaching a seven prong transfer unit to the set tester. Alternatively, a transfer unit may be plugged into other types of main units, such as voltohmmeters and capacity meters, to facilitate the measurement of some characteristic or factor of a receiver circuit.

I claim:

1. In testing apparatus, the combination with a main unit including a measuring instrument and a plurality of pin jacks adapted to be connected to said instrument, of a transfer unit removable as an entity from and having means for mechanically attaching the same to said main unit, said transfer unit comprising a tube socket and a plug having the same number and arrangement of terminals and prongs respectively, and circuit connections including pin jacks between each pair of corresponding terminals and plugs; and a pair of flexible leads having pin terminals for establishing desired connections between the pin jacks of said main unit and said transfer unit.

2. Testing apparatus as claimed in claim 1, in combination with a tip terminal on the end of said plug opposite the prongs thereof, a flexible lead having a cap terminal adapted to be placed on the tip terminal of a tube inserted in the socket of said transfer unit, and a connection including a pin jack between the tip terminal of said plug and the said cap terminal.

3. In testing apparatus, a transfer unit for establishing circuit connections between a tube socket of a radio receiver and a measuring instrument, said unit comprising a plug having prongs of the same number and design as those of a tube that may be received in the radio receiver tube socket, a tube socket having terminals corresponding to respective prongs of said plug, and connections including a pin jack between each plug prong and the corresponding terminal of said tube socket, at least one of said pin jacks including a resilient member normally completing the circuit between the associated socket terminal and plug prong, said member being adapted to be deflected into open circuit position by a pin terminal inserted into the said jack.

4. In testing apparatus, a unit comprising a tube socket adapted to receive a tube removed from a tube socket of a radio receiver, said tube socket having terminals of the same number and design as the prongs of the removed tube, and means for establishing circuit connections between the corresponding terminals of the tube socket of said unit and the tube socket of the radio receiver, said means including normally closed circuit jacks in a plurality of said circuit connections, said jacks each including a resilient member adapted to be displaced to open-circuit position by a pin terminal inserted in the jack.

5. In testing apparatus, the combination with a measuring instrument and flexible leads having pin terminals for connecting said instrument to pin jacks, of a transfer unit; said transfer unit including a tube socket and a plug having the same number and arrangement of terminals and prongs respectively, normally closed circuit connections between the prongs of said plug and the corresponding terminals of said socket, and normally closed circuit jacks in a plurality of said circuit connections, said jacks each including a resilient member adapted to be displaced to open-circuit position by a pin terminal inserted in the jack.

6. In testing apparatus, a transfer unit for establishing circuit connections between a tube socket of a radio receiver and a measuring instrument, said unit comprising a base member including a tube socket, a plug having prongs of the same number and design as those of a tube which may be received in said socket, leads connected to the plug prongs and forming a cable terminating in said base member, a plurality of pin jacks carried by said base member, and connections including at least one pin jack between each cable lead and a terminal of said socket; at least one of said connections including a pair of jacks, and a resilient member normally completing the said connection in which the pair of jacks are included, said member being deflected to open the connection by the introduction of a pin terminal into one jack of the pair.

7. In testing apparatus, a transfer unit comprising a base member, a pair of attaching plugs on said member adapted to mechanically attach the same to an instrument unit, a tube socket on said member, a plug having prongs corresponding in number and location to the terminals of said socket, leads extending from said prongs to the base member, connections between the leads and the respective terminals of the socket, certain of said connections including pin jacks, and a pair of pin sockets mounted on said base member and electrically connected to the respective attaching plugs.

8. A transfer unit as claimed in claim 7, in combination with an additional pair of pin jacks on said base member and insulated from said connections, a fixed electrical connection between the jacks of said additional pair, and a jumper having one pin terminal for insertion in one jack of said additional pair and a clamp terminal.

9. In testing apparatus, the combination with a main unit including a measuring instrument, and flexible leads having pin terminals for connecting said instrument to pin jacks, of a transfer unit constituting a physical entity separate from said main unit, said transfer unit including a tube socket and a plug having the same number and arrangement of terminals and prongs respectively, normally closed circuit connections between the prongs of said plug and the corresponding terminals of said socket, and a pair of pin jacks serially included in certain of said connections, one jack of each pair including a resilient member normally completing the circuit to the other jack of that pair, said member being displaced into open circuit position by the insertion of a pin terminal in the associated jack, whereby the said normally closed circuit connections may be opened by inserting a pin terminal in one jack of a pair but will remain closed when a pin terminal is inserted in the other jack of that pair.

10. In testing apparatus, a transfer unit for establishing circuit connections between a tube socket of a radio receiver and a measuring instrument, said unit comprising a base member including a tube socket, a plug having prongs of the same number and design as those of a tube which may be received in said socket, leads connected to the plug prongs and forming a cable terminating at the base member, circuit connection between each cable lead and the corresponding terminal of the socket, and pin jacks in certain of said circuit connections, each of said pin jacks including a resilient member normally completing the associated circuit connection and operable to open circuit position upon the introduction of a pin terminal in the jack.

JOHN H. MILLER.